(12) United States Patent
Yabusaki

(10) Patent No.: US 6,904,148 B1
(45) Date of Patent: Jun. 7, 2005

(54) OPERATION PANEL OF PORTABLE TELEPHONE

(75) Inventor: Yasunori Yabusaki, Shizuoka (JP)

(73) Assignee: Yabusaki Kougyousho Co., Ltd, Yaizu (JP)

( * ) Notice: Subject to any disclaimer, the term of this patent is extended or adjusted under 35 U.S.C. 154(b) by 0 days.

(21) Appl. No.: 09/959,286

(22) PCT Filed: Apr. 18, 2000

(86) PCT No.: PCT/JP00/02527

§ 371 (c)(1),
(2), (4) Date: Oct. 19, 2001

(87) PCT Pub. No.: WO00/65806

PCT Pub. Date: Nov. 2, 2000

(30) Foreign Application Priority Data

Apr. 21, 1999 (JP) ............................................ 11/152454

(51) Int. Cl.⁷ ................................................. H04M 1/00
(52) U.S. Cl. .................................. 379/433.07; 379/368
(58) Field of Search ................................ 379/368, 369, 379/433.06, 433.07; 200/5 R, 6 R

(56) References Cited

U.S. PATENT DOCUMENTS 5,703,932 A    12/1997  Oda 5,861,823 A  *  1/1999  Strauch et al. .............. 379/369

FOREIGN PATENT DOCUMENTS

| JP | 63-250031 | 10/1988 |
|----|-----------|---------|
| JP | 1-236054  | 9/1989  |
| JP | 4-103755  | 9/1992  |
| JP | 8-7703    | 1/1996  |
| JP | 9-83402   | 3/1997  |
| JP | 9-116605  | 5/1997  |
| JP | 9-161618  | 6/1997  |

* cited by examiner

*Primary Examiner*—Jack Chiang
(74) *Attorney, Agent, or Firm*—McGinn & Gibb, PLLC

(57) ABSTRACT

Three independent dialing buttons (10, 20 and 30) have rhombic shapes. Independent switching elements (S1)–(S4) are provided on four corners of the rear surface of each dialing button. Dial numbers (1–9 and 0) and symbols (# and *), grouped four each as (1, 2, 3 and 4), (5, 6, 7 and 8) and (9, 0, # and *), are marked on the respective four corners of the front surfaces of the three dialing buttons which are arranged longitudinally on an operation surface (50). By this construction, the visibility and recognizability of numbers, etc. can be improved and, further, dialing of numbers can be accurately made.

24 Claims, 5 Drawing Sheets

OPERATION PANEL OF PORTABLE TELEPHONE

TECHNICAL FIELD

The present invention relates to an operation panel of portable telephone. More particularly, the present invention relates to the operation panel of portable telephone in which the facile operation and better visibility are accomplished.

BACKGROUND ART

The conventional portable telephone usually comprises a display panel in the upper portion of the main body, and many dialing buttons and various function operation buttons in the middle and lower portion thereof. Those buttons are provided independently, and each of dialing buttons and function operation buttons has an exclusive and multiple marking of numerals, letters and signs so that the text information may be input by those buttons. For example, the dialing buttons respectively indicate any dial number among "1–9" and "0" and symbols "#" and "*," together with any letter such as Japanese Katakana Letters "ア(a)," "カ (ka)," "サ(sa)," "タ(ta)," "ナ(na)," etc., and Latin Alphabets "A," "B," "C," etc. Further, the function operation buttons respectively indicate the word(s) such as "Clear," "Call," "Memory," etc., together with the symbol such as "×," "÷," "@," the "symbol of telephone," etc.

There has been provided a portable telephone as disclosed in the Official Gazette of the Unexamined Japanese Utility Model Publication No. Hei 4-103755, comprising a single and large operation disk on which the dial numbers "1–9" and "0," and symbols "#" and "*" are marked. The rear surface of the disk has a plurality of switch mechanisms corresponding to the respective numbers or symbols on the front side. Consequently, when any portion of the disk indicating the desired dial number is depressed, only the switch mechanism under such number is turned ON. It will be the most characteristic aspect of this switch that the numbers "1–9" and "0," and symbols "#" and "*" are collectively marked on the single operation disk.

However, according to the conventional portable telephone as above discussed comprising many dialing buttons and function operation buttons, because of the small size of respective buttons, and because of the narrow space between the buttons adjacent to each other, the operation is thereof is not easy, and there may occur an inaccurate operation. Further, since the size of each operation button is small, the acceptable size of numerals, letters and symbols marked thereon must be reduced, hence the visibility and recognizability of these markings would become poor. In particular, when used at night or in the dark place, or when used by e.g. the old people whose sight are not good, there may arise the problem that the numerals, letters or symbols will not be marked effectively.

Further, according to the "switch" disk disclosed in the Official Gazette of the Unexamined Japanese Utility Model Publication No. Hei 4-103755, it may have an advantageous point that, since the single operation disk collectively indicates the dial numbers "1–9" and "0," and symbols "#" and "*," it seems to become easier to depress the dial numbers. However, according to this "switch" disk, the space between each dial numbers shall become narrower, and if the depressed position is slightly out of the correct position, it will result in an inaccurate operation. Further, even in the case of "switch" disk, the acceptable size of numerals, letters and symbols marked thereon must be reduced, hence the visibility and recognizability of thereof would become still poor. In particular, when used at night or in the dark place, or when used by e.g. the old people whose sight are not good, there may be the risk of an inaccurate operation. In addition, due to the complicated structure of "switch" disk, the production cost would become higher.

In the light of technical backgrounds and problems according to the independent many operation buttons or to the switch operated by the single disk used for the portable telephones as above discussed, it is an object of the present invention to provide an operation panel of portable telephone which improves the visibility and recognizability of the numerals, etc., and secures the accurate dialing of numbers.

DISCLOSURE OF INVENTION

To achieve the objects mentioned above, according to claim 1 of the present invention, there is provided an operation panel of portable telephone comprising rhombic shape of three independent dialing buttons, wherein, independent four switching elements are provided on four corners of the rear surface of each of said dialing button, dial numbers (1–9 and 0) and symbols (# and *) are marked on the respective four corners of the front surfaces of said dialing buttons, and said three dialing buttons are arranged in a longitudinal direction on an operation surface.

According to claim 2 of the present invention, there is provided an operation panel of portable telephone comprising rhombic shape of three independent dialing buttons, wherein, independent four switching elements provided on four corners of the rear surface of each of said dialing button, dial numbers and symbols (# and *) are grouped four each as (1, 2, 3 and 4), (5, 6, 7 and 8) and (9, 0, # and *) and marked on the respective four corners of the front surfaces of said dialing buttons, and said three dialing buttons are arranged in a longitudinal direction on an operation surface.

With this structure, according to claims 1 and 2 of the present invention, each of the large rhombic operation buttons is provided with the independent four switch elements on the four corners. The four corners of each of the front surface of the rhombic operation buttons have the respective markings of dial number, etc. Consequently, the large size of dial numbers and symbols can be marked, and the space between these numbers, etc. may become wider. Thus the visibility and recognizability of the markings may improve, and the accurate dialing can be made. In particular, even in the case of operation at night or in the dark place, because of the rhombic shape of each dialing button, the four corners of the dialing button can be recognized by the sense of touch of the fingers. Accordingly, it is possible to use the portable telephone without any inaccurate operation even by those whose sight are not good or by the old people.

According to claim 3 of the present invention, there is provided an operation panel of portable telephone comprising oval shape of three independent dialing buttons, wherein, independent four switching elements are provided on four corners of the rear surface of each of said dialing button, dial numbers (1–9 and 0) and symbols (# and *) are marked on the respective four corners of the front surfaces of said dialing buttons, and said three dialing buttons are arranged in a longitudinal direction on an operation surface.

According to claim 4 of the present invention, there is provided an operation panel of portable telephone comprising oval shape of three independent dialing buttons, wherein, independent four switching elements are provided on four corners of the rear surface of each of said dialing button, dial numbers and symbols (# and *) are grouped four each as (1, 2, 3 and 4), (5, 6, 7 and 8) and (9, 0, # and *) and marked on the respective four corners of the front surfaces of said dialing buttons, and said three dialing buttons are arranged in a longitudinal direction on an operation surface.

With this structure, according to claims 3 and 4 of the present invention, each of the large oval operation buttons is provided with the independent four switch elements at the four peaks. The four peaks of each of the front surface of the oval operation buttons have the respective markings of dial number, etc. Consequently, the large size of dial numbers and symbols can be marked, and the space between these numbers, etc. may become wider. Thus the visibility and recognizability of the markings may improve, and the accurate dialing can be made. In particular, even in the case of operation at night or in the dark place, because of the oval shape of each dialing button, the four peaks of the dialing button can be recognized by the sense of touch of the fingers. Accordingly, it is possible to use the portable telephone without any inaccurate operation even by those whose sight are not good or by the old people.

According to claim 5 of the present invention, there is provided the operation panel for portable telephone as claimed in any one of claims 1 through 4, further comprising function operation buttons at spaces on the right and left of said dialing buttons arranged in a longitudinal direction on the operation surface.

With this structure, according to claim 5 of the present invention, the function operation buttons are placed at the space provided on the right and left of the dialing buttons arranged longitudinally on the operation surface. Thus the function operation buttons can be reasonably placed on the narrow space of the operation surface, and the visibility and recognizability of the markings may improve, and the facile operation can be accomplished.

BEST MODE FOR CARRYING OUT THE INVENTION

First Embodiment

Figure 1:
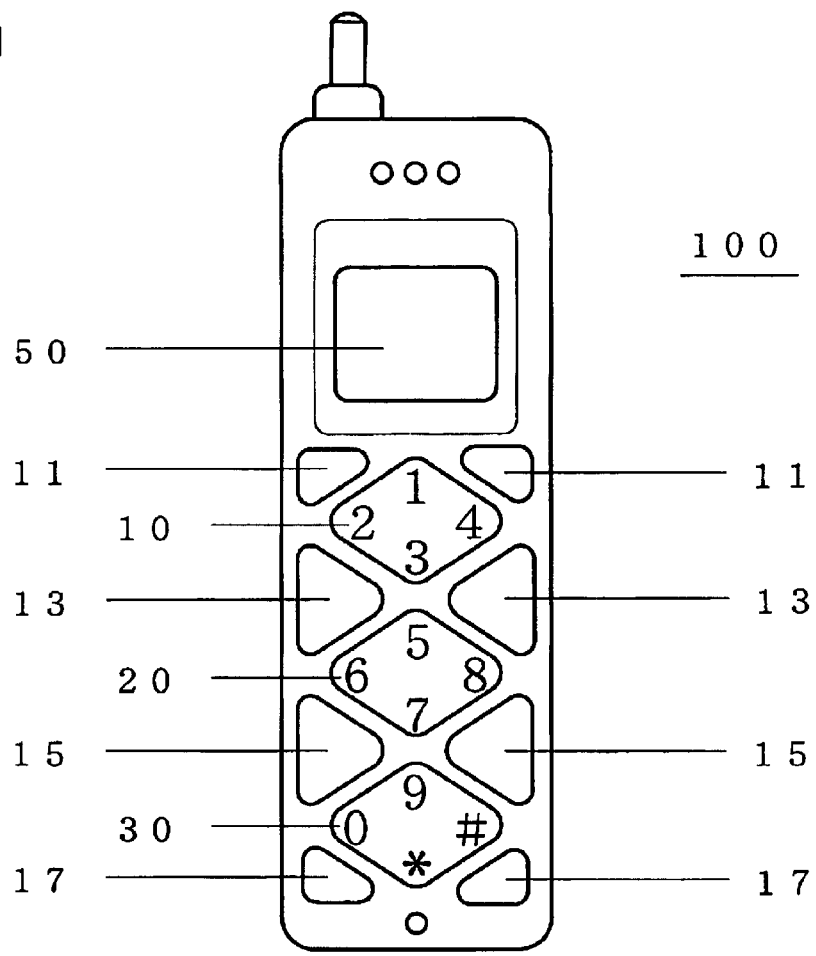
FIG. 1 is a front view of a portable telephone according to a first embodiment of the present invention.

The detailed explanation of an operation panel of portable telephone according to the present invention will now be made with reference to the drawings attached hereto. FIG. 1 illustrates a first embodiment of the present invention. There is a portable telephone 100 having an operation panel (operation surface) 50, on which three dialing buttons 10, 20 and 30, and function operation buttons 11 through 17 are placed.

Figure 2:
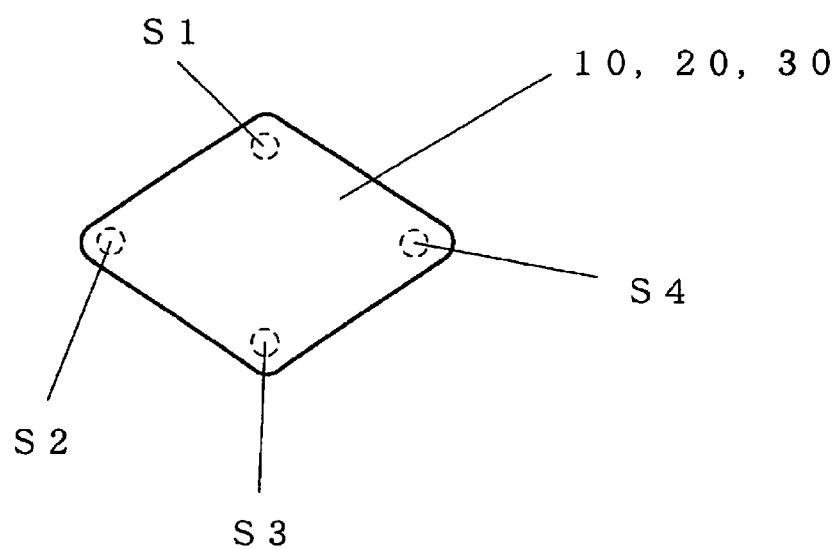
FIG. 2 is a front view of a dialing button according to the first embodiment of the present invention.
Figure 3:
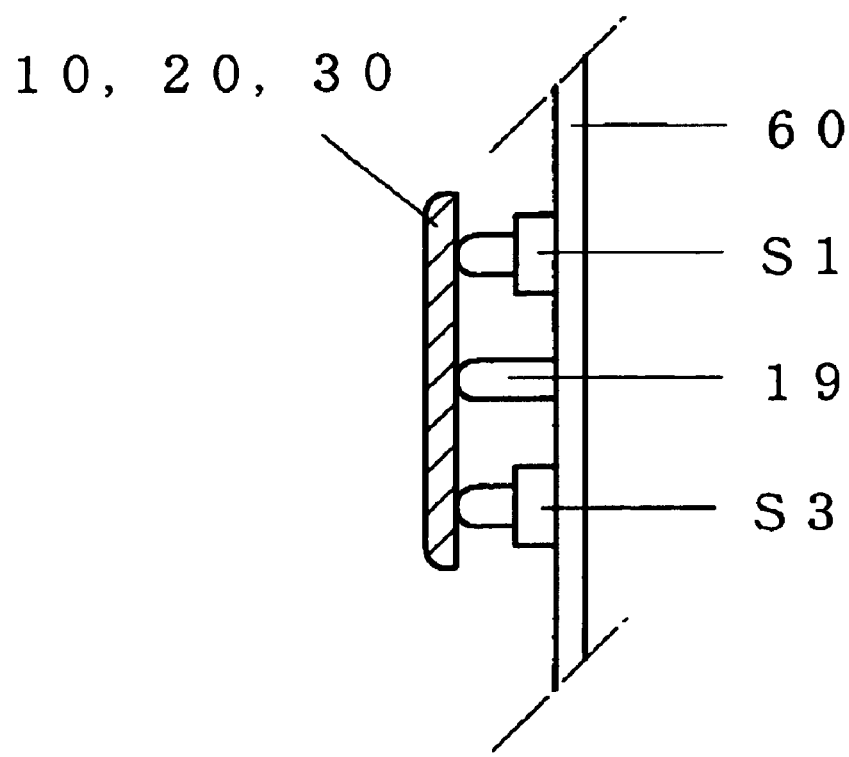
FIG. 3 is a sectional view of the dialing button according to the first embodiment of the present invention.

As illustrated in FIG. 1, each of the dialing buttons 10, 20 and 30 is in the rhombic shape having a large area. Dial numbers (1–9 and 0) and symbols (# and *), grouped four each as (1, 2, 3 and 4), (5, 6, 7 and 8) and (9, 10, # and *), are marked on the respective four corners of the front surfaces of the three dialing buttons 10, 20 and 30, thereby the "dial numbers" and "symbols of # and *" are marked in parallel. As illustrated in FIGS. 2 and 3, each of the dialing buttons 10, 20 and 30 is provided with independent switching elements S1 through S4 on the four corners of the rear surface thereof. The switching elements S1 through S4 are mounted on a substrate 60. Each of the dialing buttons 10, 20 and 30 is supported by a fulcrum 19 provided at the center of the substrate 60, and when any corner of the dialing buttons 10, 20 or 30 is depressed, the switch element correspondingly depressed by means of the fulcrum 19 is turned ON.

The three dialing buttons 10, 20 and 30 as above discussed are arranged longitudinally on the operation surface 50. The dialing button 10 placed in the upper portion has the marking of (1, 2, 3 and 4) on the four corners of the front surface. The dialing button 20 in the middle portion has the marking of (5, 6, 7 and 8) on the four corners of the front surface. And the dialing button 30 in the lower portion has the marking of (0, 9, # and *) on the four corners of the front surface. It is also possible to indicate letters such as Japanese Katakana Letters "ア(a)," "カ(ka)," "サ(sa)," "タ(ta)," "ナ(na)," etc., or Latin Alphabets "A," "B," "C," etc., together with the symbols "#" and "*." There are formed wide spaces on the right and left portions of three dialing buttons 10, 20 and 30 arranged in the longitudinal direction as above discussed, in which other function operation buttons 11, 13, 15 and 17 in an appropriate shape and size are placed. The function operation buttons 11, 13, 16 and 17 respectively indicate the words such as "Clear," "Power," "Menu," "Call," "Memory," etc., and the symbols such as "×," "÷," "@," "the symbol of telephone," etc., in an appropriate allocation.

With this structure, the present invention has the following function. As illustrated in FIGS. 1 through 3, the three large rhombic operation buttons 10, 20 and 30 are respectively provided with independent switch elements S1 through S4 on the four corners. The four corners of each of the front surface of the rhombic operation button have the respective markings of dial numbers (1, 2, 3 and 4) and (5, 6, 7 and 8), and that of the combination of dial numbers and symbols (9, 0, # and *), each being grouped four. Since the operation surface 50 occupies a large area of the front panel of the portable telephone, there are sufficient spaces formed between the dial numbers and the symbols "#" and "*." Consequently, the large size of dial numbers and symbols can be marked, thus the visibility and recognizability of the markings may improve, and the accurate dialing can be made. In particular, even in the case of operation at night or in the dark place, because of the rhombic shape of each dialing button, the four corners of the dialing button can be recognized by the sense of touch of the fingers. Accordingly, it is possible to use the portable telephone without any inaccurate operation even by those whose sight are not good or by the old people.

Further, as above discussed, the other function operation buttons 11, 13, 15 and 17 are placed at the space provided on the right and left of the three dialing buttons 10, 20 and 30 arranged longitudinally on the operation surface 50. This means the reasonable arrangement of the function operation buttons 11, 13, 15 and 17 on the right and left sides of the wider area of the operation surface 50. Therefore, as to the function operation buttons 11, 13, 15 and 17, the visibility and recognizability of the markings may also improve, and the facile operation can be accomplished.

The operation panel (operation surface) 50 of the portable telephone 100 according to the first embodiment of the present invention is not limited to that as illustrated in FIGS. 1 through 3. For example, the respective markings of dial numbers (1, 2, 3 and 4) and (5, 6, 7 and 8), and that of the combination of dial numbers and symbols (9, 0, # and *), each being grouped four and separately positioned on the four corners of the front surfaces of the rhombic operation buttons, may be arranged in the reverse order from the lower portion to the upper portion. Further, although the order of the dial numbers and the symbols "#" and "*" positioned on the four corners of the front surfaces of the rhombic operation buttons in the illustrated embodiment are arranged in the counterclockwise direction, it is also possible to arrange them freely, such as in the clockwise direction, or in the order of the top, the bottom, the left and the right, etc.

Figure 4:
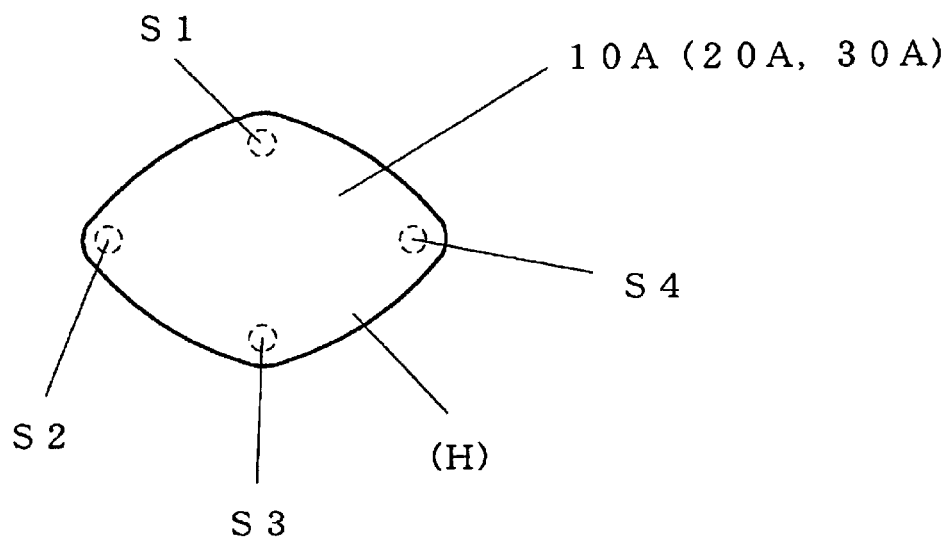
FIG. 4 is a front view of the dialing button in a different shape according to the first embodiment of the present invention.

FIG. 4 is an example of the different shape of the dialing button according to the first embodiment. According to a dialing button 10A (20A, 30A) as shown in FIG. 4, each of four sides (H) of the rhombic dialing button 10A is curved protrusively in the outward direction, whereby the operator touching this button may sense the soft feeling.

Figure 5:
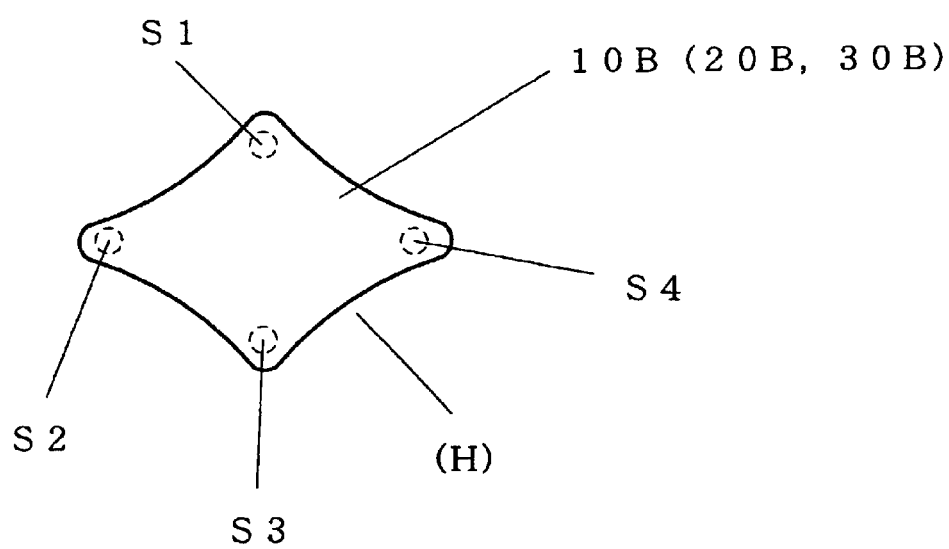
FIG. 5 is a front view of the dialing button in a different shape according to the first embodiment of the present invention.

FIG. 5 is another example of the different shape of the dialing button according to the first embodiment. According to a dialing button 10B (20B, 30B) as shown in FIG. 5, each of four sides (H) of the rhombic dialing button 10B is curved intrusively in the inward direction, whereby the operator may recognize the shape and position of the dialing button by simply touching thereof.

Figure 6:
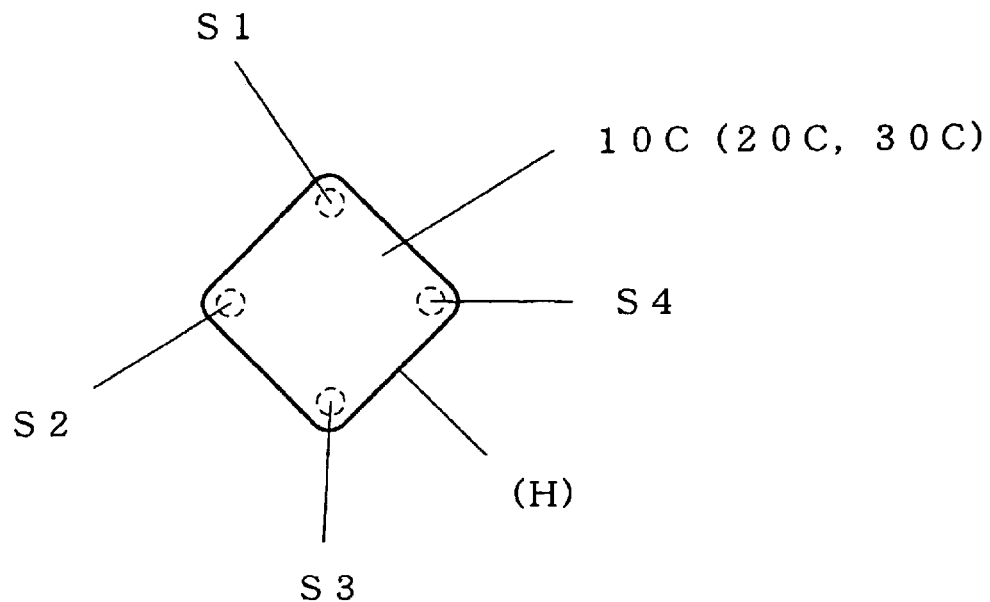
FIG. 6 is a front view of the dialing button in a different shape according to the first embodiment of the present invention.

FIG. 6 is another example of the different shape of the dialing button according to the first embodiment. According to a dialing button 10C (20C, 30C) as shown in FIG. 6, each of four sides (H) of the rhombic dialing button 10C has the equal length in order to form a "square" rhombus (i.e. each length of the diagonal of the rhombus is equal). This shape will contribute to the compact arrangement of the operation buttons on the operation surface.

Figure 7:
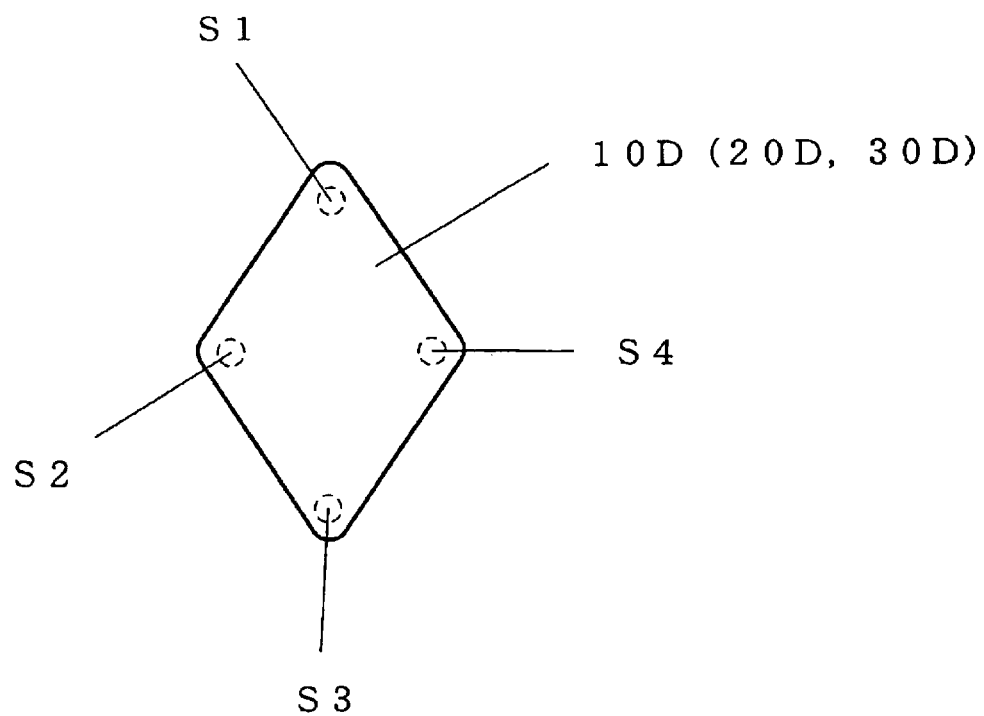
FIG. 7 is a front view of the dialing button in a different shape according to the first embodiment of the present invention.

FIG. 7 is still another example of the different shape of the dialing button according to the first embodiment. According to a dialing button 10D (20D, 30D) as shown in FIG. 7, the diagonal of the rhombus in the longitudinal direction is longer than that in the horizontal direction. Consequently, it is possible to secure still wider spaces on the right and left of the dialing buttons. This shape will enable the function operation buttons 11, 13, 15 and 17 to be positioned freely on the operation surface.

Second Embodiment

Figure 8:
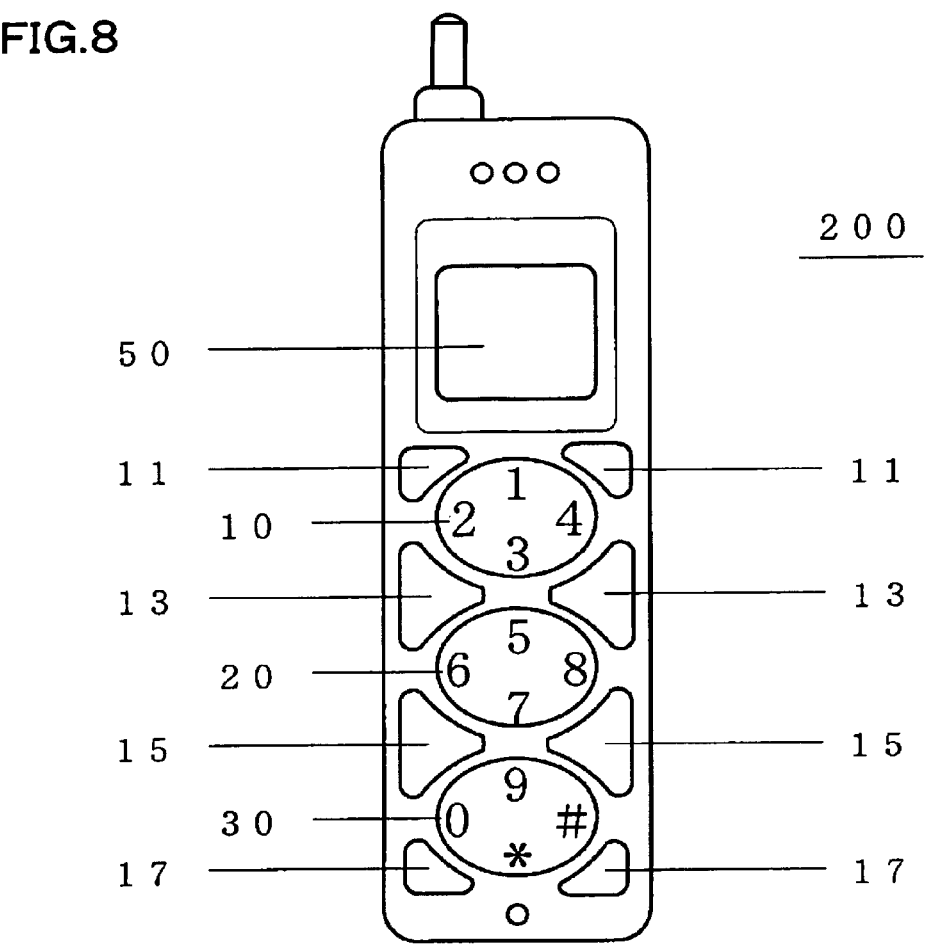
FIG. 8 is a front view of a portable telephone according to a second embodiment of the present invention.
Figure 9:
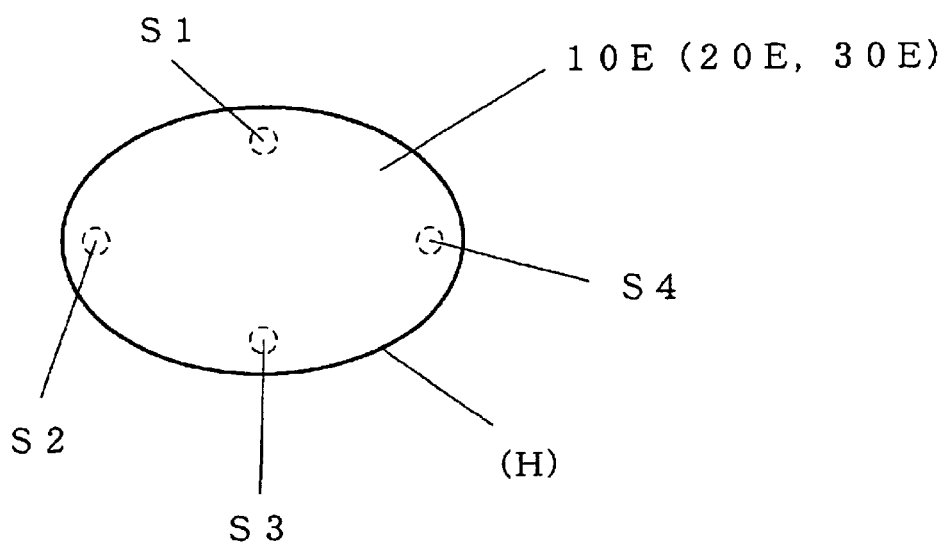
FIG. 9 is a front view of a dialing button according to the second embodiment of the present invention.

The second embodiment of the present invention will now be described with reference to FIGS. 8 and 9 showing a portable telephone 200. According to the portable telephone 200, each of three dialing buttons 10E, 20E and 30E placed on the operation panel (operation surface) 50 is in the oval shape. The function operation buttons 11 through 17 are placed at the spaces provided on the right and left of the dialing buttons 10E, 20E and 30E arranged in the longitudinal direction on the operation surface 50.

The dialing buttons 10E, 20E and 30E respectively have larger areas, which is the same as the case of the first embodiment. The dial numbers (1–9 and 0) and the symbols (# and *), grouped four each as (1, 2, 3 and 4), (5, 6, 7 and 8) and (9, 10, # and *), are marked on the respective four peaks (the top end, the bottom end, the right end and the left end) of the front surfaces of the three dialing buttons 10E, 20E and 30E, thereby the "dial numbers" and "symbols of # and *" are marked in parallel. Each of the dialing buttons 10E, 20E and 30E is provided with independent switching elements S1 through S4 on four peaks of the rear surface thereof, which is the same as the case of the first embodiment. Accordingly, when any peak of the dialing buttons 10E, 20E or 30E is depressed, the switch element correspondingly depressed is turned ON.

The three dialing buttons 10E, 20E and 30E as above discussed are arranged longitudinally on the operation surface 50. The dialing button 10E placed in the upper portion has the marking of (1, 2, 3 and 4) on the four corners of the front surface. The dialing button 20E in the middle portion has the marking of (5, 6, 7 and 8) on the four corners of the front surface. And the dialing button 30E in the lower portion has the marking of (0, 9, # and *) on the four corners of the front surface. There are formed wide spaces on the right and left portions of three dialing buttons 10E, 20E and 30E arranged in the longitudinal direction as above discussed, in which other function operation buttons 11, 13, 15 and 17 in an appropriate shape and size are placed. The function operation buttons 11, 13, 15 and 17 respectively indicate the words such as "Clear," "Power," "Menu," "Call," "Memory," etc., and the symbols such as "×," "÷," "@," "the symbol of telephone," etc., in an appropriate allocation.

The portable telephone 200 according to the second embodiment has the characteristic of the oval shape of the three dialing buttons 10E, 20E and 30E placed on the operation surface 50. The line (H) along the rim of the dialing button as a whole is in a round and oval shape, whereby the operator touching this button may sense the soft feeling.

According to the second embodiment of the present invention, since the marking of each dialing number becomes larger, the visibility and recognizability of the markings may improve, and the accurate dialing can be accomplished, which is the same as the case of the first embodiment. In particular, it is possible to use the portable telephone without any inaccurate operation by the sense of the fingers touching the peak of the oval dialing button. Thus it is possible to use the portable telephone even by those whose sight are not good or by the old people.

Since each of the dialing buttons according to the second embodiment has a sufficient large area, it is possible to indicate the dialing numbers (1, 2, 3 and 4), (5, 6, 7 and 8) and (9, 10, # and *), and to further indicate various letters and symbols of the function operation buttons in parallel, such as "Clear," "Call" and "Memory," and Japanese Katakana Letters "ア(a)," "カ(ka)," "サ(sa)," "タ(ta)," "ナ(na)," etc., and Latin Alphabets "A," "B," "C," etc., and the symbols such as "×," "÷," "@," "the symbol of telephone," etc., in an appropriate allocation. According to the second embodiment, it is suitable to marking of the dialing numbers and symbols on the dialing buttons in parallel.

INDUSTRIAL APPLICABILITY

As above discussed, according to claims 1 and 2 of the present invention, each of the large rhombic operation buttons is provided with the independent four switch elements on the four corners. The four corners of each of the front surface of the rhombic operation buttons have the respective markings of dial number, etc. Consequently, the large size of dial numbers and symbols can be marked, and the space between these numbers, etc. may become wider. Thus the visibility and recognizability of the markings may improve, and the accurate dialing can be made. In particular, even in the case of operation at night or in the dark place, because of the rhombic shape of each dialing button, the four corners of the dialing button can be recognized by the sense of touch of the fingers. Accordingly, it is possible to use the portable telephone without any inaccurate operation even by those whose sight are not good or by the old people.

According to claims 3 and 4 of the present invention, each of the large oval operation buttons is provided with the independent four switch elements at the four peaks. The four peaks of each of the front surface of the oval operation buttons have the respective markings of dial number, etc. Consequently, the large size of dial numbers and symbols can be marked, and the space between these numbers, etc. may become wider. Thus the visibility and recognizability of the markings may improve, and the accurate dialing can be made. In particular, even in the case of operation at night or in the dark place, because of the oval shape of each dialing button, the four peaks of the dialing button can be recognized by the sense of touch of the fingers. Accordingly, it is possible to use the portable telephone without any inaccurate operation even by those whose sight are not good or by the old people.

According to claim 5 of the present invention, the function operation buttons are placed at the space provided on the right and left of the dialing buttons arranged longitudinally on the operation surface. Thus the function operation buttons can be reasonably placed on the narrow space of the operation surface, and the visibility and recognizability of the markings may improve, and the facile operation can be accomplished.

What is claimed is:

1. An operation panel of portable telephone comprising:
   three independent rhombic-shaped dialing buttons; and
   a plurality of function operation buttons disposed between said dialing buttons and comprising a shape conforming to a shape of said dialing buttons.
   wherein independent four switching elements are provided on four corners of the rear surface of each of said dialing buttons, dial numbers (1–9 and 0) and symbols (# and *) are marked on the respective four corners of the front surfaces of said dialing buttons, and said three dialing buttons are arranged in a longitudinal direction on an operation surface.

2. An operation panel of portable telephone comprising:
   three independent rhombic-shaped dialing buttons; and
   a plurality of function operation buttons disposed between said dialing buttons and comprising a shape conforming to a shape of said dialing buttons,
   wherein independent four switching elements are provided on four corners of the rear surface of each of said dialing buttons, dial numbers and symbols (# and *) are grouped four each as (1, 2, 3 and 4), (5, 6, 7 and 8) and (9, 0, # and *) and marked on the respective four corners of the front surfaces of said dialing buttons, and said three dialing buttons are arranged in a longitudinal direction on an operation surface.

3. An operation panel of portable telephone comprising:
   three independent oval-shaped dialing buttons; and
   a plurality of function operation buttons disposed between said dialing buttons and comprising a shape conforming to a shape of said dialing buttons.
   wherein independent four switching elements are provided on four corners of the rear surface of each of said dialing buttons, dial numbers (1–9 and 0) and symbols (# and *) are marked on the respective four corners of the front surfaces of said dialing buttons, and said three dialing buttons are arranged in a longitudinal direction on an operation surface.

4. An operation panel of portable telephone comprising:
   three independent oval-shaped dialing buttons; and
   a plurality of function operation buttons disposed between said dialing buttons and comprising a shape conforming to a shape of said dialing buttons.
   wherein independent four switching elements being provided on four corners of the rear surface of each of said dialing buttons, dial numbers and symbols (# and *) are grouped four each as (1, 2, 3 and 4), (5, 6, 7 and 8) and (9, 0 # and *) and marked on the respective four corners of the front surfaces of said dialing buttons, and said three dialing buttons are arranged in a longitudinal direction on an operation surface.

5. The operation panel for portable telephone as claimed in claim 1, wherein said function operation buttons are disposed at spaces on a first side and a second side of said dialing buttons arranged in a longitudinal direction on the operation surface.

6. The operation panel for portable telephone as claimed in claim 2, wherein said function operation buttons are disposed at spaces on a first side and a second side of said dialing buttons arranged in a longitudinal direction on the operation surface.

7. The operation panel for portable telephone as claimed in claim 3, wherein said function operation buttons are disposed at spaces on a first side and a second side of said dialing buttons arranged in a longitudinal direction on the operation surface.

8. The operation panel for portable telephone as claimed in claim 4, wherein said function operation buttons are disposed at spaces on a first side and a second side of said dialing buttons arranged in a longitudinal direction on the operation surface.

9. The operation panel for portable telephone as claimed in claim 5, wherein said function operation buttons are substantially triangular in shape to conform to the shape of the dialing buttons and such that said function operation buttons fit in the spaces on the first and second sides of said dialing buttons.

10. The operation panel for portable telephone as claimed in claim 6, wherein said function operation buttons are substantially triangular in shape to conform to the shape of the dialing buttons and such that said function operation buttons fit in the spaces on the first and second sides of said dialing buttons.

11. The operation panel for portable telephone as claimed in claim 7, wherein said function operation buttons are substantially triangular in shape and have curved sides to conform to the shape of the dialing buttons and such that said function operation buttons fit in the spaces on the first and second sides of said dialing buttons.

12. The operation panel for portable telephone as claimed in claim 8, wherein said function operation buttons are substantially triangular in shape and have curved sides to conform to the shape of the dialing buttons and such that said function operation buttons fit in the spaces on the first and second sides of said dialing buttons.

13. The operation panel for portable telephone as claimed in claim 1, wherein said dialing buttons are arranged along the center of said operation panel with the dialing buttons positioned in a single longitudinal column.

14. The operation panel for portable telephone as claimed in claim 2, wherein said dialing buttons are arranged along the center of said operation panel with the dialing buttons positioned in a single longitudinal column.

15. The operation panel for portable telephone as claimed in claim 3, wherein said dialing buttons are arranged along the center of said operation panel with the dialing buttons positioned in a single longitudinal column.

16. The operation panel for portable telephone as claimed in claim 4, wherein said dialing buttons are arranged along the center of said operation panel with the dialing buttons positioned in a single longitudinal column.

17. The operation panel for portable telephone as claimed in claim 1, wherein said dialing buttons occupy a substantial portion of the operation surface to provide a predetermined space between said dial numbers and symbols on each of said dialing buttons.

18. The operation panel for portable telephone as claimed in claim 2, wherein said dialing buttons occupy a substantial portion of the operation surface to provide a predetermined space between said dial numbers and symbols on each of said dialing buttons.

19. The operation panel for portable telephone as claimed in claim 3, wherein said dialing buttons occupy a substantial portion of the operation surface to provide a predetermined space between said dial numbers and symbols on each of said dialing buttons.

20. The operation panel for portable telephone as claimed in claim 4, wherein said dialing buttons occupy a substantial portion of the operation surface to provide a predetermined space between said dial numbers and symbols on each of said dialing buttons.

21. The operation panel for portable telephone as claimed in claim 1, wherein each dial number and symbol correspond to one of said independent switching elements.

22. The operation panel for portable telephone as claimed in claim 2, wherein each dial number and symbol correspond to one of said independent switching elements.

23. The operation panel for portable telephone as claimed in claim 3, wherein each dial number and symbol correspond to one of said independent switching elements.

24. The operation panel for portable telephone as claimed in claim 4, wherein each dial number and symbol correspond to one of said independent switching elements.

* * * * *